May 19, 1964

J. A. PAIVANAS ETAL

3,133,422

INSULATION CONSTRUCTION

Filed May 31, 1962

INVENTORS
JOHN A. PAIVANAS
ARTHUR W. FRANCIS
DAVID I-J. WANG

BY John C. LeFever

ATTORNEY

May 19, 1964 J. A. PAIVANAS ETAL 3,133,422
INSULATION CONSTRUCTION
Filed May 31, 1962 5 Sheets-Sheet 2

INVENTORS
JOHN A. PAIVANAS
ATHUR W. FRANCIS
DAVID I-J. WANG
BY John C. Le Fever
ATTORNEY May 19, 1964

J. A. PAIVANAS ETAL 3,133,422

INSULATION CONSTRUCTION

Filed May 31, 1962

INVENTORS
JOHN A. PAIVANAS
ARTHUR W. FRANCIS
DAVID I-J. WANG

BY John C. Le Fever

ATTORNEY

May 19, 1964 J. A. PAIVANAS ETAL 3,133,422
INSULATION CONSTRUCTION
Filed May 31, 1962 5 Sheets-Sheet 4

INVENTORS
JOHN A. PAIVANAS
ARTHUR W. FRANCIS
DAVID I-J. WANG
BY
ATTORNEY

FIG. 10

3,133,422
						INSULATION CONSTRUCTION
John A. Paivanas, Williamsville, Arthur W. Francis, New
 City, and David I-J. Wang, Buffalo, N.Y., assignors to
 Union Carbide Corporation, a corporation of New
 York
				Filed May 31, 1962, Ser. No. 198,987
						17 Claims. (Cl. 62—50)

This invention relates to an improved insulation construction between relatively warm and cold walls, as for example the inner vessel and outer casing of a double-walled container for low boiling liquefied gases such as helium and hydrogen.

The problem of transporting and handling very low-boiling gases such as helium and hydrogen in liquid form is much more severe than that of transporting liquid oxygen and nitrogen. For example, the heat required to vaporize 1 liter of liquid helium is approximately 3 B.t.u., or about 1 percent of the heat required to vaporize 1 liter of liquefied oxygen. Consequently, great care must be taken to minimize the amount of heat that passes through the container into the liquid helium. At atmospheric pressure liquid helium boils at about −269° C., and unless a highly efficient insulating system is provided, a substantial portion of the stored liquid will evaporate due to atmospheric heat inleak. This in turn results in pressure rise, which must be relieved by venting and consequent loss of product. On the other hand, the commercial usage of these very low boiling liquefied gases has expanded in recent years to the point where large quantities are required at locations remote from the point of liquefaction. This means that the containers must be of rugged construction and readily portable.

The prior art has proposed various methods for improving insulation effectiveness. One common method is to interpose a jacket containing a vaporizable liquid across the heat flow path intermediate the cold and warm walls. Heat intercepted by the jacket is absorbed by the vaporizing liquid and is "rejected" as vapor back to the warm side of the system. For example, liquid hydrogen may be protected in this manner by vaporizing expendable liquid nitrogen in the jacket. The objections of such prior art methods have been their structural complexity and expense, and the limited improvement which they could achieve. Also, an auxiliary refrigerant fluid and a source for replenishing this fluid is required.

Other prior art systems for limiting the atmospheric heat inleak partially offset the volumetric advantage of storing helium as a liquid rather than as a gas, since they require an extremely large insulation space between the helium storage vessel and the outer casing of the container thereby increasing the external dimensions of the container for a particular capacity and reducing the portability of the container.

It is an object of the present invention to provide an improved insulations system wherein the heat flowing towards the cold wall is minimized without structural complexity and without the need for large quantities of expendable auxiliary refrigerant. Another object is to provide an improved double-walled container for storing low-boiling liquefied gases, wherein loss of the contents through evaporation is minimized. Still another object is to provide such a container having the additional characteristics of highly efficient insulation hence small vacuum space, rugged construction, high portability, and no need of an expendable liquefied gas refrigerant.

These and other objects and advantages will be apparent from the ensuing disclosure and appended claims.

According to the principle employed in this invention, heat which unavoidably flows through the insulation system toward the cold wall is intercepted in at least one and preferably in a plurality of steps, and is transported by solid conduction through a shield positioned at each such step to a point of heat exchange with a heat absorbing fluid. The invention permits maximum utilization of the heat absorbing capacity of the fluid and reduces by 5 to 30-fold the net heat reaching the cold wall.

More specifically, one embodiment of this invention contemplates an insulation construction between relatively warm and cold walls comprising a composite multi-layered insulation disposed between the walls. The insulation layers are disposed generally parallel to the walls and normal to the flow of heat, and comprise both low conductive and radiant heat barrier materials. A fluid conduit extends from the cold wall to the warm wall for transporting a heat absorbing fluid from the cold wall to the warm wall. At least one thin, non self-supporting flexible, highly conductive metal shield is disposed between these walls, being coextensive with and supported on both sides by the multi-layered insulation. The shield is secured to the fluid conduit by low thermal resistance means at a region where the temperature is lower than the temperature assumed by the shield absent the securing so as to transfer heat from the shield to the fluid conduit.

In this manner, the refrigeration of the heat absorbing fluid is transferred through the conduit walls and through the highly conductive securing means to the shield. Stated in another way, of the total heat entering a conductive shield from the warm wall, a portion is intercepted and conducted to the fluid and thence to the heat absorbing fluid itself. Only the remainder of the total heat is allowed to pass further towards the cold wall. Thus, with a succession of such "interceptions" (i.e., multiple conductive shields), the net heat influx to the cold wall is greatly reduced.

The heat absorbing fluid used in this invention may be one which absorbs sensible heat only and does not change phase or a catalyst may be positioned in the fluid conduit so that gaseous para hydrogen passing therethrough is converted to the ortho form. The latter possesses considerable sensible refrigeration which can then be recovered. Alternatively, the heat absorbing fluid may be a liquid which vaporizes during transit through the conduit, so that both latent and sensible refrigeration are used to cool the conductive shields. A further choice is a fluid which undergoes endothermic chemical change at the higher temperatures encountered in passage through the insulation system. Finally, a binary fluid may be used whereby fractional vaporization or desorption of one component occurs as the fluid absorbs heat. The heat absorbing fluid may result from melting a portion of a stored solid.

As previously indicated, the composite multi-layered insulation disposed between the warm and cold walls comprises low conductive material and radiant heat barrier material, thereby substantially reducing the amount of heat inleak due to conduction and radiation. The low conductive material is preferably fibrous and composed of many elements of small cross-section dimension having a solid volume not exceeding 10 percent of its gross volume (at least 90 percent voids). A particularly suitable composite insulation consists of alternating layers of a thin flexible metal foil such as aluminum or copper and an elastically compressible web or mat of glass fiber. This insulation is described and claimed in U.S. Patent No. 3,009,601 issued November 21, 1961 to L. C. Matsch, the disclosure being incorporated herein to the extent pertinent. Another widely employed low conductive material is permanently precompacted paper composed of unbonded fibers, as more fully described and claimed in U.S. Patent No. 2,009,600, also issued November 21, 1961 to L. C. Matsch.

Another suitale composite multi-layer insulation is the metal coated, flexible plastic material described in U.S. Patent No. 3,013,016 issued January 23, 1962 to M. P. Hnilicka, Jr. The metal coating should have a thickness less than about 0.25 micron and yet be sufficiently thick to have an emissivity less than 0.06. The individual layers of metal coated plastic are preferably permanently deformed, as by crumpling, so as to be free of extensive areas of planar contact. A suggested composite is aluminum coated polyethylene terephthalate film.

Most of the multi-layer insulations described above are fragile, highly resilient, and very compression sensitive. Despite this fact, we have discovered a method for supporting conductive heat shields entirely by means of such insulation in a manner which avoids the need for complex fabrication of a rigid self-supporting shield. Structurally this is achieved by making the conductive shield thin, flexible, and light in weight so that it is essentially self-conforming to the contour of the insulation layers. Shields of such thinness, however, are limited in the quantity of conductive heat they can transport along their length to the point of attachment to the conduit. Not only must the thin shields be made of a highly conductive material, but the heat load or duty imposed on the shield must be kept low. This is accomplished by employing the highly effective composite multi-layered insulation on the warm side of the shield.

When a plurality of conductive shields is employed, the insulation construction of this invention has the aspect of a very efficient heat exchanger operating between two mediums. One medium is the composite multi-layered insulating material which occupies the spaces adjacent the conductive shields and through which heat is transmitted toward the cold wall. The quantity of heat entering the insulation construction from the warm wall is dependent upon the thermal conductivity ($k$) of this insulation. The other medium is the heat absorbing fluid which flows oppositely through a conduit toward the warm wall, and which diverts and absorbs in stepwise fashion a large part of the heat flowing through the composite multi-layered insulating material toward the cold wall.

It would be logical to assume that when multiple conductive shields are employed, the surfaces of these shields may be made highly reflective so that they serve also as radiation shields. Thus, they would function as the radiant heat barrier material of the insulation. However, we have unexpectedly found that when radiation is a controlling mode of heat transfer between the warm and cold walls, heat inleak from the warm wall is minimized if both conductive shields and radiation barrier material within the composite insulation are employed. Stated in another manner, the conductive shields perform more nearly isothermally when separate radiation barriers are incorporated in the multi-layer insulation. The explanation for this improvement is that the radiation barrier material greatly reduces the quantity of heat reaching the conductive shields, so that the amount of heat to be removed by the conductive shields is also reduced. This means that relatively thin conductive shields may be employed instead of thick shields. The use of thin non self-supporting, conductive shields permits the employment of more shields per unit insulation thickness thereby improving the overall insulating quality. Conversely, the thin shields facilitate a needed low overall thermal conductivity with a fewer number of shields in a simpler construction weighing much less than a construction involving a larger number of relatively thick shields.

Since the thin conductive shields perform in a manner approaching isothermal conditions, all regions of the insulation construction benefit equally from the invention and for example the rate of heat transfer through the upper and lower sections of the construction is substantially the same.

While each conductive shield may be a single thickness of metal, it may be alternatively applied as a multiple thickness of very thin foil by, for example, spiral winding such foil around the multi-layer composite insulation at the appropriate locations. Spiral winding is a particularly advantageous technique for obtaining maximum flexibility with very low temperature gradient along the shield. The total thickness of each conductive shield is related to its thermal conductivity and the length through which heat is conducted. The total thickness, while relatively thin and non self-supporting as previously discussed, must be sufficient to limit the maximum temperature difference across the conductive shield to a low value which is less than the temperature difference between immediately adjacent shields at a particular cross-sectional plane through the insulation construction.

It should be recognized that the heat transfer requirements of the warmer outer conductive shields are slightly greater than for the colder inner conductive shields. One embodiment of this invention compensates for this variation by decreasing the thickness of the highly conductive metal shields with decreasing temperature in the insulating space. That is, the shields adjacent to the cold wall or inner vessel are thinner than the shields adjacent to the warm wall or outer shell. A disadvantage of this arrangement is the increased construction costs, and for simplicity it may be preferable to employ multiple conductive shields of the same total thickness.

It is important to clearly differentiate the heat conductive shields of this invention from radiation shields, employed by certain prior art insulation. The conductive shields are formed of highly conductive material having a thermal conductive $k$ of at least 5 B.t.u./hr. ft. ° R. at 100° K. and preferably 40–400 B.t.u./hr. ft. ° R. Lower values do not permit sufficiently rapid heat transfer to the heat absorbing fluid as it flows through the conduit between the cold and warm walls of the insulation construction. Also, such heat conductive shields need not be highly reflective. Suitable heat conductive shield materials include aluminum, copper, silver and gold. In contrast, the prior art radiation shields need not be highly conductive and if desired may be composed of metal coated plastic films, most plastics having relatively low thermal conductivity values.

Another significant difference between heat conductive shields and radiation shields is that the former are relatively thicker, i.e. 0.001–0.030 inch, although still thin enough on an absolute basis to be non self-supporting. Thinner shields exhibit excessive temperature gradient and do not transfer sufficient heat or refrigeration by solid conduction, and thicker self-supporting shields may overcompress the insulation and would unnecessarily increase the overall dimensions, weight and cost of the container, as previously discussed. In contrast, radiation shields only serve to provide a highly reflective surface and therefore are preferably as thin as possible so that a maximum number of shields may be provided to intercept radiant energy in the insulation thickness of minimum weight. Radiation shields as employed in this invention are less than about 0.0008 inch thick, and usually about 0.00025 inch thick. Moreover, the heat conductive shields are secured to the fluid conduit by low thermal resistance means so as to afford high heat transfer rates. Radiation shields are preferably either not attached to the fluid conduit or alternatively attached by means having high thermal resistance.

Figure 1:
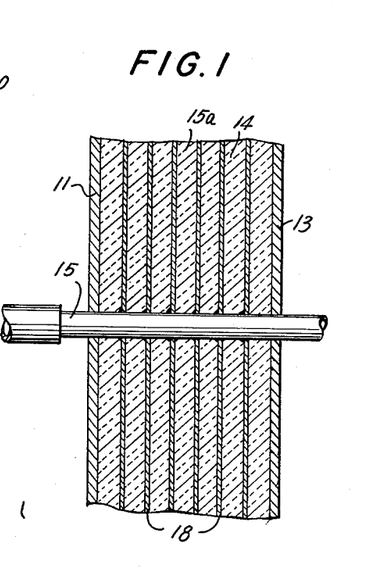
FIG. 1 is a sectional fragmentary view of an insulation construction embodying features of the present invention.
Figure 3:
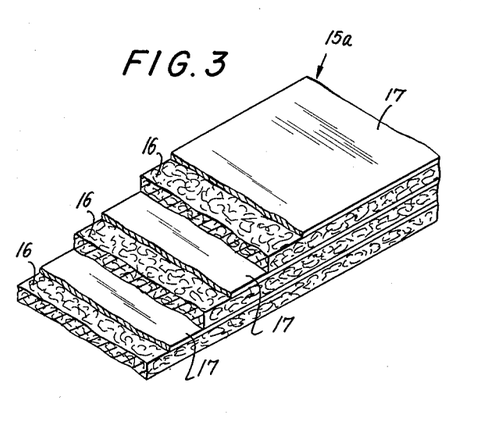
FIG. 3 is an isometric view of one form of the composite insulation used in the invention.
Figure 4:
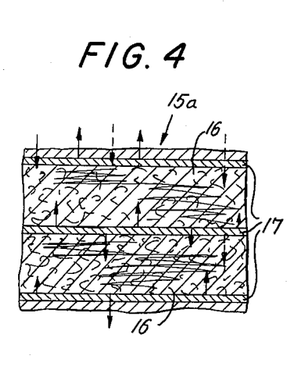
FIG. 4 is a greatly enlarged detail sectional view showing the irregular path of heat transfer through the composite insulation of FIG. 3.

Referring now more specifically to the drawings and FIG. 1, an insulation construction is shown having cold wall 11 and warm wall 13 arranged with a space 14 therebetween. A composite multi-layered insulation 15a is disposed within space 14 and comprises essentially a low heat conductive fibrous material 16 arranged in alternate layers with thin, reflecting shields 17 for diminishing the transfer of heat by radiation (see FIGS. 3 and 4). In FIG. 4, the insulation appears as a series of low conductive fibers 16 and spaced reflectors 17 disposed substantially transversely to the direction of heat flow.

The sequence of modes of heat transfer which might occur in a typical multi-layer insulation of aluminum foils which are proximately spaced from each other by layers of glass fiber having a fiber orientation substantially parallel to the aluminum foils and transverse to the direction of heat flow, might be as follows:

Referring to FIG. 4, radiant heat striking the first sheet of aluminum foil will for the most part be reflected, and the remaining part absorbed. Part of this absorbed radiation will tend to travel toward the next barrier by re-radiation, where again it will be mostly reflected, part will travel by solid conduction, and a minor part by conduction through the residual gas. According to the solid conduction method of heat transfer, the heat leak proceeds along the fiber layers in what might be considered an irrgular path, crossing relatively small areas of point contact between crossing fibers until it reaches the second sheet of aluminum foil, where the heat reflecting and absorbing process described above is repeated. Because of the particular orientation of the individual fibers in the layers, the path of solid conduction from the first sheet of aluminum foil to the second is greatly lengthened, and encompasses an indefinitely large number of point contact resistances between contacting fibers. By analogy it will be seen that a multilayer insulation having a series of heat reflecting sheets and an oriented (fiber) layer of low conductive insulating material therebetween may be particularly efficient in preventing or diminishing heat losses by radiation as well as by conduction.

To minimize heat inleak through the insulation 15a, high heat conductive but non self-supporting shields 18 are interposed within the insulation in spaced relation between cold wall 11 and warm wall 13. While the invention will be described and illustrated in detail with respect to multiple conductive shields, the preferred embodiment, the same principles apply when a single conductive shield is employed. These heat conductive shields 18, preferably of metallic construction, are secured to heat absorbing fluid conduit 15 by low thermal resistance means, as for example metal bonding. Each conductive shield 18 is secured to the fluid conduit 15 at a region along its length wherein the temperature is lower than the temperature which would be assumed by the shield absent the securing. That is, a heat asorbing fluid such as a low boiling liquefied gas, i.e. helium, flows through conduit 15 in a direction by the cold wall 11 and towards the warm wall 13. The relatively cold gas contains considerable sensible refrigeration and the bulk of this refrigeration is transferred by solid conduction through the walls of conduit 15 to shields 18. In this manner, the refrigeration intercepts the heat inleak through warm wall 13 and composite multilayered insulation 15a.

With respect to longitudinal spacing of the heat conductive shields 18 along the outer surface of heat absorbing fluid conduit 15, slightly more efficient refrigerant transfer is attained by positioning the shields closer to each other near the cold wall 11 than near the warm wall 13. This is due to the positive temperature-thermal conductivity relationship of the composite insulation. That is, the conductivity coefficient $k$ increases with rising temperature. However, the plotted curve of net heat inleak versus conductive shield longitudinal spacing has a very flat minimum so that for the sake of simplicity of construction, a uniform spacing along the length of the fluid conduit 15 is satisfactory.

Figure 2:
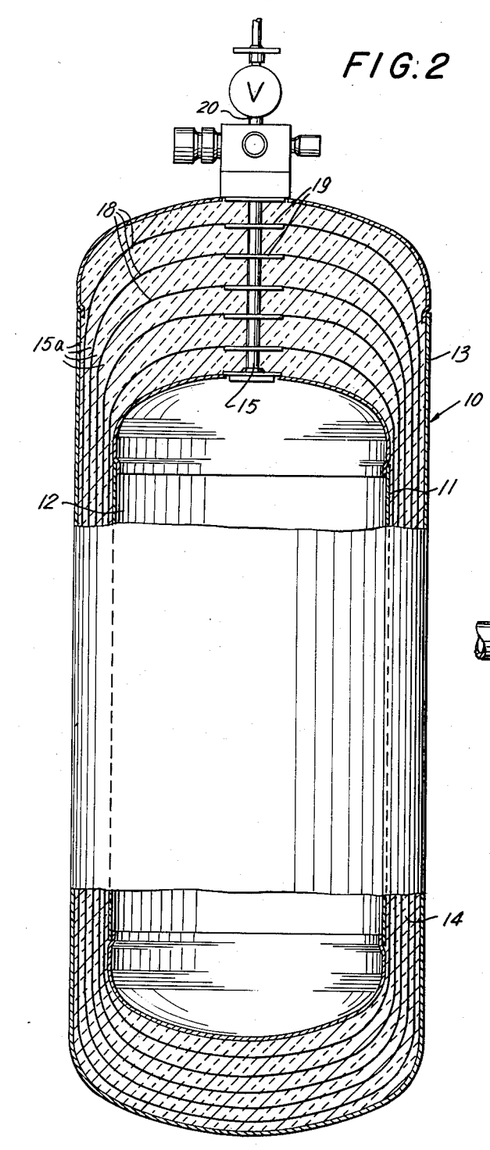
FIG. 2 is a view of a longitudinal cross-section through a liquefied gas storage container constructed according to the present invention.

FIG. 2 illustrates a preferred embodiment of the invention, namely a double-walled, low boiling liquefied gas container 10. Inner vessel 11 storing the product liquid 12, e.g., liquid helium, is surrounded by outer casing 13 with vacuum space 14 therebetween. The inner vessel 11 is supported by neck tube 15, also serving as the previously defined heat absorbing fluid conduit. In this embodiment the heat absorbing fluid is gas evaporated from the product liquid. Disposed within the vacuum space 14 is the previously described composite multi-layered insulation 15a, also serving to stabilize inner vessel 11 against lateral movement or side-sway. Multiple heat conductive shields 18 are secured to neck-tube evaporation conduit 15 by disks 19. The latter are spaced across vacuum space 14, concentrically positioned around evaporation conduit 15 and attached thereto. The shield 18 positioned nearest the inner vessel 10 is secured, for example by metal bonding, to the coldest disk 19 being nearest the inner vessel 11. The shields positioned nearer the outer casing 13 are secured to disks progressively nearer the warm end of neck tube-evaporation conduit 15.

When the inner vessel 11 contains low boiling liquefied gas such as helium, a portion of the liquid is evaporated due to atmospheric heat inleak through the insulation 15a. The evaporation gas flows upwardly through conduit 15 and is discharged from the container through vent valve 20, set to open at a predetermined pressure as for example 5 p.s.i.g. However, the evaporation gas contains considerable sensible refrigeration and the bulk of this refrigeration is transferred by solid conduction through the walls of conduit 15 to shields 18. The refrigeration is transmitted through shields 18 around the perimeter of inner vessel 11 within vacuum space 14, and intercepts the heat inleak through composite insulation 15a within such space.

The effectiveness of multiple conductive shields in reducing heat inleak and evaporation from a container is dependent upon the ratio of sensible heat to latent heat of the particular liquefied gas stored. This ratio is defined as $$R = \frac{C_p(T_a - T_s)}{\Delta H_v}$$

where:
$\Delta H_v$ is the heat of vaporization of the fluid, B.t.u./lb.
$C_p$ is the average specific heat of the vapor over the range $T_a$, ambient temperature, and $T_s$, saturation temperature of the liquid, B.t.u./lb. °F.

The following Table I shows normal evaporation reduction ratios for one, five, ten and an infinite number of thin, non self-supporting conductive shields, spaced uniformly within a vacuum space filled with glass fiber mat-aluminum foil insulation for various cryogenic fluids:

TABLE I

| Fluid | Sensible Heat/ Latent Heat | Normal Evaporation Reduction Ratio | | | | |
|---|---|---|---|---|---|---|
| | | Number of Conductive Shields | | | | |
| | | Zero | One | Five | Ten | Infinite |
| Helium | 63.5 | 1.0 | 5.8 | 17.5 | 21.0 | 25.3 |
| Hydrogen | 8.6 | 1.0 | 1.95 | 4.0 | 4.6 | 5.5 |
| Neon | 3.4 | 1.0 | 1.31 | 2.0 | 2.3 | 2.6 |
| Nitrogen | 1.13 | 1.0 | 1.13 | 1.40 | 1.50 | 1.75 |
| Oxygen | 0.87 | 1.0 | 1.10 | 1.30 | 1.40 | 1.55 |
| Argon | 0.69 | 1.0 | 1.08 | 1.21 | 1.28 | 1.40 |

The "Normal Evaporation Reduction Ratio" as used herein is defined as the evaporation rate without any recovery of sensible heat (i.e. a vessel with the composite insulation only) divided by the evaporation rate using the same thickness of composite insulation and conductive shields. It will be apparent from Table I that this invention is most effective for containers storing liquid helium hydrogen and neon, that is, liquefied gases boiling below about 30° K. at atmospheric pressure.

The invention was demonstrated in two experiments, the first employing a single conductive shield and the second utilizing nine conductive shields.

*Example I*

A cylindrical stainless steel inner vessel 6.92 inches O.D. x 27.5 inches long was installed in a vacuum jacket. A stainless steel evaporation conduit-neck tube 9.81 inches long and having 0.375 inch O.D. x 0.012 inch wall thickness connected the inner vessel and the outer casing. The inner vessel was wrapped with 0.17 inch of glass fiber-aluminum foil composite insulation having the following characteristics:

Glass fiber diameter ____________ 0.5–0.75 micron.
Glass fiber sheet weight ____________ 1.6 gm./ft.²
Aluminum foil thickness ____________ 0.00025 inch.
Layers of sheet per inch ____________ 82.

After the 0.17 inch thickness of insulation was wrapped around the inner vessel, one copper shield 0.0109 inch thick was installed around the insulation and soldered to the evaporation conduit at a point three-tenths of the distance from the inner liquid vessel to the outer casing. An additional 0.77 inch of the aluminum foil-glass fiber composite insulation was spirally wrapped over the shield at a density of 65 layers per inch. This provided a total of 0.94 inch of the composite insulation with a 10.9 mil copper shield positioned so that 18 per cent of the insulation was between it and the inner liquid vessel, and the balance of the insulation between the shield and the outer casing. With liquid helium in the inner vessel, the theoretical rate of evaporation is 0.133 lb./hr. if there were no recovery of sensible refrigeration. With the one heat conductive shield installed as described above, the helium evaporation rate was found to be 0.0183 lb./hr. The improvement factor was 7.27, in good agreement with a theoretically predicted value of 7.17. For a single conductive shield and glass fiber-aluminum foil composite insulation, the optimum conductive shield location is approximately 20 percent of the distance from the cold inner vessel to the warm outer casing.

*Example II*

To evaluate the employment of multiple conductive shields, an experiment was performed using the inner vessel and outer casing of Example I. The inner vessel was first spirally wrapped with 0.17 inch of the glass fiber-aluminum foil composite insulation described in Example I. At this point and for 8 succeeding points (total of 9) at intervals of every five layers of the composite insulation, an additional conductive aluminum shield about 1.25 mils thick (0.00125 inch) was inserted within the insulation, aluminum being used for convenience only. These nine conductive shields were spaced 0.077 inch apart within the composite insulation and soldered to the evaporation conduit-neck tube at ¾ inch intervals. The total composite insulation thickness was 0.94 inch. Again the heat inleak to the inner vessel containing liquid helium would result in boil-off of 0.133 lb./hr. without the conductive shield. With the nine conductive shields secured to the evaporation conduit, the measured boil-off was 0.0075 lb./hr. of liquid helium. The improvement factor was 17.7 compared with the theoretical improvement factor of 19.7.

The necessity of employing both radiant heat barriers in the composite multi-layered insulation, and the conductive shields has been discussed above. The unexpected advantages of this combination are illustrated by comparing the liquid helium boil-off rates of the Example II container, with and without the aluminum foil radiant heat barrier. The boil-off rate using this barrier and the conductive shields was 0.0075 lb./hr. of liquid helium. The boil-off rate is at least five times greater using the same glass fiber low conductive material and the same conductive shields but without aluminum foil. It is thus apparent that the combination of low conductive material-radiant heat barrier material, multi-layered insulation with conductive shields represents a substantial improvement in minimizing heat inleak from a warm wall to a cold wall.

Figure 5:
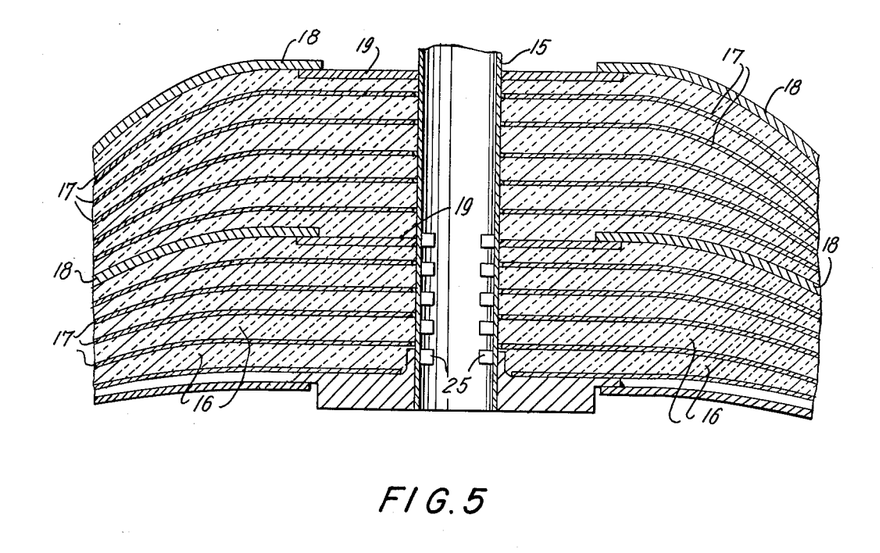
FIG. 5 is a greatly enlarged sectional fragmentary view of an evaporation conduit assembly similar to the FIG. 2 embodiment, but containing flow resistance means.

In certain insulation construction, the heat transfer rate between the heat absorbing gas and the fluid conduit may not be sufficiently high. The invention embodiment of FIG. 5 is particularly advantageous for such situations, wherein heat transfer area increasing means are secured to the inner surface of evaporation gas conduit 15. Fins 25 constructed of high heat conductive material such as copper, are provided in spaced relation along the length of conduit 15 between inner vessel 11 and outer casing 13. These fins 25 serve to increase the heat transfer surface area between evaporation gas and conduit 15, and thus increase the heat transfer coefficient therebetween. In this manner, a larger portion of the sensible refrigeration is recovered by the conductive shields 18. Other heat transfer area increasing means could be employed, as for example baffles or spikes. In general, these fins or baffles should be located at spaced intervals along the length of the fluid conduit-neck tube, for otherwise they would contribute appreciably to the heat conduction down the conduit.

Alternatively, overall heat exchange between the heat absorbing fluid and the fluid conduit can be enhanced by restricting the vapor flow thereby increasing the flow velocity and the heat transfer coefficient. Such flow restriction can be obtained, for example, by the use of loose-fitting plugs within the conduit.

Figure 6:
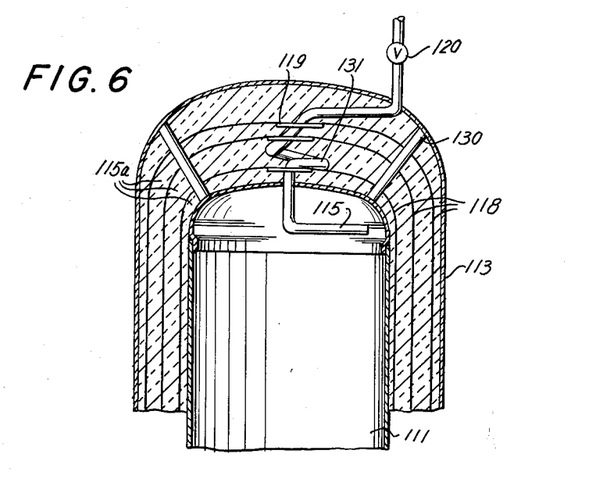
FIG. 6 is a view of a longitudinal cross-section through a container practicing another form of the invention.

It will be noted that in the FIG. 2 embodiment, the evaporation conduit 15 also served as the inner vessel support means. FIG. 6 illustrates another low-boiling liquefied gas container 110 practicing a different form of the invention in which the inner vessel 111 is supported and stabilized by load-rods 130. These rods may be positioned, for example, at each end of inner vessel 111. Evaporation gas conduit 115 does not serve as a structural member, and may be coiled so as to increase its length and the resultant heat transfer path. If desired, the coils 131 may be positioned between adjacent heat conductive shields 118. In addition to their securing to evaporation gas conduit 115, heat conductive shields 118 may be attached to inner vessel load rod supports 130 at appropriate temperature levels to additionally refrigerate the supports and thereby reduce the net heat influx through these supports. In contrast to the case of the securements to the evaporation gas conduit, the regions of contact should be warmer than the shield, absent the connection. Also, to be effective the securing means must have low thermal resistance, as for example metal bonding.

Figure 7:
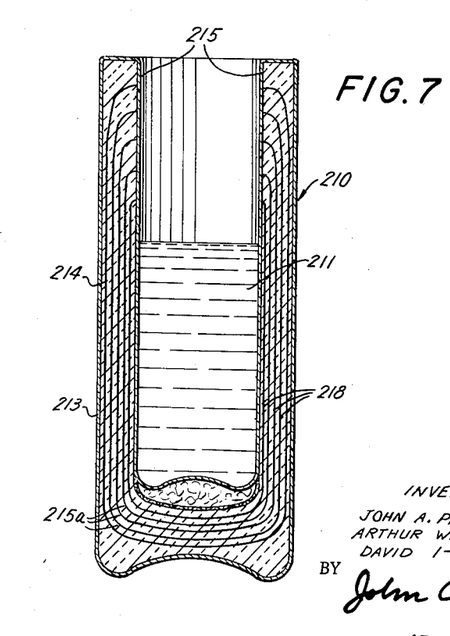
FIG. 7 is a view of a longitudinal cross-section through another container embodiment having an open upper end.

In the FIG. 7 embodiment, an open mouth type container 210 is illustrated, in which the warmer upper end portion of inner vessel 211 constitutes the evaporation gas conduit 215. The vacuum space 214 contains composite insulation 215a and heat conductive shields 218 between insulation layers. The upper ends of shields 218 are secured to inner vessel warm end wall-evaporation gas conduit 215 by low thermal resistance means as previously described. Shield upper ends 218 may be oriented in any convenient initial direction, i.e. upwardly, downwardly or sideways, the essential characteristic being attachment at intervals spaced so as to establish a temperature gradient across the adjacent conductive shields. A suitably insulated plug (not illustrated) for the upper end portion of container 210 may also be employed.

All of the heretofore described and illustrated container embodiments are closed and sealed in at least one end. This invention also contemplates a container in which neither end is closed, that is, a liquefied gas conduit as for example illustrated in FIGS. 8 and 9. Such a conduit may be employed for transferring cryogenic liquids, e.g. liquid helium or hydrogen, over relatively long distances such as 1–100 miles.

Figure 8:
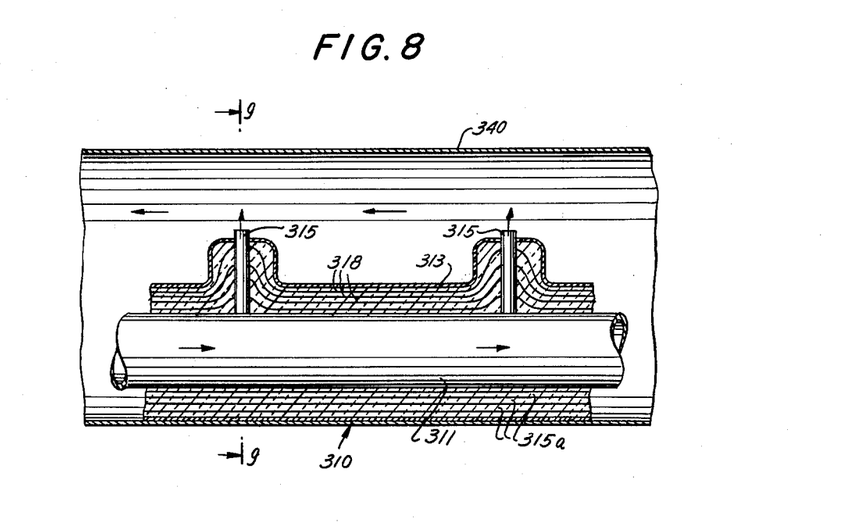
FIG. 8 is a view of a longitudinal cross-section through still another container embodiment in the form of a liquefied gas conduit.
Figure 9:
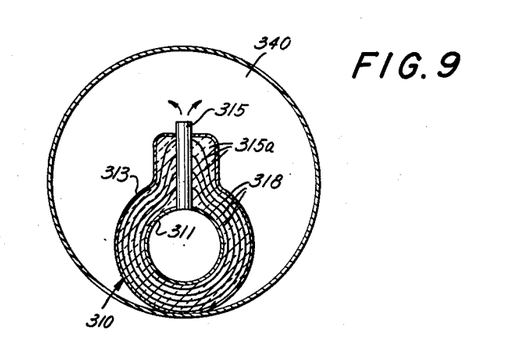
FIG. 9 is an end view of a cross-section through the FIG. 8 container taken along the line 9—9.

Referring now to FIGS. 8 and 9, the evaporation gas from liquid conduit 311 is collected through conduits 315 longitudinally spaced at appropriate intervals and drawn to manifold 340. The latter joins the outer ends of evaporation gas conduits 315, and the collected evaporation gas may be compressed, reliquefied and returned to the conduit-container 310 if desired. Manifold 340 need not be insulated, and may be located adjacent to or concentrically positioned around conduit 310 as illustrated.

In summary, the insulation construction of this invention affords a manifold decrease in heat inleak through a warm wall to a cold wall. The heat leak reduction or improvement is greatest when the heat absorbing fluid is one of the lowest boiling liquids, for which the ratio of sensible to latent heat is high. Another significant advantage of the liquefied gas container embodiment over conventional cryogenic liquid containers is the appreciable reduction in cooldown time required for filling an ambient temperature container with cold liquid. This is because the flash-off gas passing out the evaporation gas conduit effectively refrigerates the insulation as well. Thus, the total cooldown loss is essentially that required to cool the inner vessel only to liquid temperature. Since the cooldown time is thus shortened, the cold product liquid losses by evaporation after filling are greatly reduced.

Figure 10:
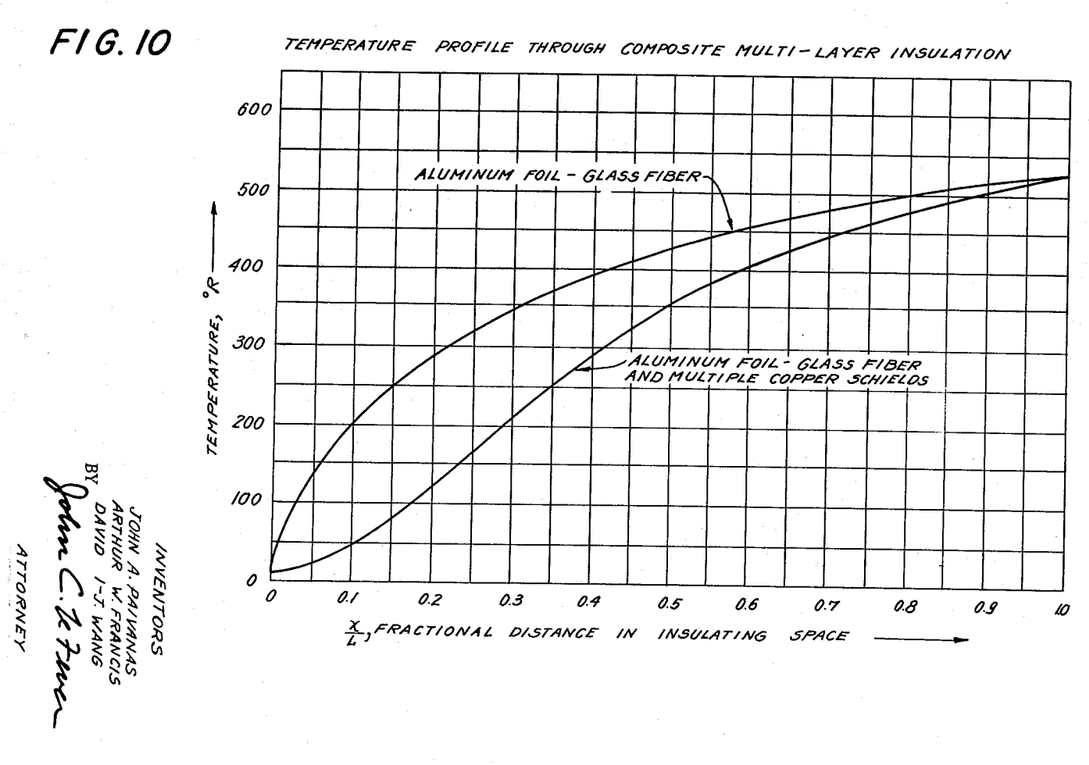
FIG. 10 is a graph showing the advantageous effect of the present invention on the temperature profile of composite insulation under vacuum conditions.

A still further advantage of this invention is that the heat conductive shields provide a desirable distortion of the temperature profile through the composite insulation between the warm wall and the cold wall. By this distortion, the temperature of a substantial portion of the insulation is reduced. FIG. 10 is a qualitative comparison of the temperature profile through an aluminum foil-glass fiber mat insulation with and without ten uniformly spaced heat conductive copper shields. Liquid helium was in the inner vessel and the temperature extremities were −268° C. and 21° C. It should be noted that the curve for multiple conductive shields has an inflection region near the cold end, which greatly reduces the slope of the curve or the temperature gradient near the cold wall. A comparison of the temperature gradients over the colder portion of the insulation indicates the reduction in heat transfer afforded by the conductive shields.

Although we have thus far discussed cryogenic temperature embodiments of this invention wherein the warm temperature is essentially room temperature of 70° F., another form of this invention is useful for insulation constructions where the warmer temperature is at least 1500° F. such as encountered for supersonic aircraft, or as high as 3000° F. for orbital space vehicles upon reentry into the earth's atmosphere. One example of such usage would be for protection of personnel and/or instrumentation in a thermally insulated vehicle, from such high temperatures by discharging a sacrificial fluid such as water, carbon dioxide, air, fuel or oxidant through vent passages extending through the insulated structure. Obviously, there are severe weight limitations on such vehicles, and the weight of the insulation system as well as the weight of sacrificial fluid thus employed must be reduced to an absolute minimum.

Prior art high temperature insulations such as ceramic fiber, foams, and the like have exhibited thermal conductivities of about $30 \times 10^{-3}$ to $100 \times 10^{-3}$ B.t.u./hr.$\times$sq. ft.$\times$° F./ft. at temperatures on the order of 3000° F. Reliable high vacuum walls for such temperatures are difficult, if not impossible to construct. Recognizing these limitations of the prior art, the compromise has been proposed of using less-than-adequate insulation in combination with cooling coils against the cold wall so as to maintain such parts of the vehicle at safe temperatures of 100°–200° F.

To demonstrate the advantages of the present invention, let us assume a supersonic aircraft whose exterior is exposed to 1800° F. and whose interior walls are to be held at 100°–200° F. For one insulation system, assume that we use a 2-inch thickness of one of the best high-temperature fibrous insulations available today for which the overall thermal conductivity $k=40 \times 10^{-3}$ at 1800° F., without radiation barriers and under non-vacuum conditions. Table II compares the consumption of coolant fluid, with and without the use of multiple conductive shields (abbreviated as "MCS"). It is seen that if water is employed only as structural coolant on the cold wall, 0.42 lb. water/sq. ft.$\times$hr. will be required to maintain the desired internal temperature. If water vapor is used to cool multiple conductive shields in the insulation, its consumption is reduced to 0.26 lb/sq. ft.$\times$hr. Far superior results are obtained by employing the combination of composite multi-layer insulation and conductive shields under a vacuum pressure. For example, a 1-inch thickness of multiple layers of thin ceramic fiber paper (3.5 gm./sq. ft.) alternating with ½ mil bright copper foil at a shield density of 55 foils per inch may be employed with multiple conductive shields. The $k$-value of such insulation is $1 \times 10^{-3}$ B.t.u./ hr.$\times$sq. ft.$\times$° F. or less. Table II shows that by using the multiple conductive shields of this invention, coolant consumption is thereby reduced from 0.021 to 0.013 lb./sq. ft.$\times$hr. in the case of water as the heat absorbing fluid, and from 0.014 to 0.0046 lb./sq.ft.$\times$hr. in the case of cold hydrogen vapor as the heat absorbing fluid. This means that less than 8 oz. hydrogen per hour will be needed to "operate" 100 sq. ft. of composite multi-layered insulation multiple conductive shields.

TABLE II

| Insulation | Coolant | Weight of Fluid Consumed, lb./sq. ft. × hr. | |
|---|---|---|---|
| | | Without MCS | With MCS |
| 2″ thickness of inorganic fiber | $H_2O$ | .42 | .26 |
| 1″ thickness of 3.5 gm./sq ft. ceramic fiber paper with ½ mil bright copper foil, 55 layers/in. Vacuum <1µ Hg. | $H_2O$ | .021 | .013 |
| | $H_2$ Vapor at −300° F. | .014 | .0046 |

Although preferred embodiments of the invention have been described in detail, it is to be understood that modifications and variations may be effected without departing from the spirit and scope of the invention. For example, although the insulation constructions have been specifically described in terms of rigid warm and cold walls, the walls could be flexible as, for example, plastic sheathing. As a further alternative, the warm and cold sides or boundaries of the composite insulation may comprise the walls as long as means are provided for holding the insulation in place.

What is claimed is:

1. An insulation construction between relatively warm and cold walls comprising: a composite multi-layered insulation having low conductive material and radiant heat barrier material disposed between said walls, the layers being disposed generally parallel to the walls and normal to the flow of heat; a fluid conduit extending from the cold wall to the warm wall for transporting a heat absorbing fluid from the cold wall to the warm wall; at least one thin, non self-supporting flexible, highly conductive metal shield disposed between said walls being coextensive with and supported on both sides by said multi-layered insulation, said shield being secured to said fluid conduit by low thermal resistance means at a region where the temperature is lower than the temperature assumed by said shield absent the securing so as to transfer heat from the shield to said fluid conduit.

2. An insulation construction according to claim 1 in which said shield is constructed of material having thermal conductivity of at least 5 B.t.u./hr. ft. ° F. at 100° K. and a thickness of 0.001–0.03 inch.

3. An insulation construction according to claim 2 in which said composite multi-layered insulation comprises low conductive fibrous material layers having individual fiber diameters less than about 10 microns and thin flexible sheet radiation barrier layers of less than about 0.008 inch thickness being arranged in alternating sequence.

4. An insulation constructed according to claim 2 in which said composite multi-layered insulation comprises metal coated nonmetallic plastic material, the metal coating having a thickness less than about 0.25 micron.

5. A low boiling liquefied gas container comprising an inner vessel for holding the liquefied gas; an outer shell surrounding said inner vessel and spaced therefrom so as to form an intervening vacuum space; an evaporation gas conduit between said inner vessel and said outer shell for transporting such gas from the container and having a temperature gradient across said vacuum space; a composite multi-layered insulation disposed within such space comprising low conductive material and radiant heat barrier material; at least one thin, non self-supporting flexible highly conductive metal shield disposed in said vacuum space and surrounding said inner vessel, said shield being supported on both sides by said multi-layered insulation and secured to said evaporation gas conduit by low thermal resistance means at a region where the temperature is lower than the temperature assumed by said shield absent the securing so as to transfer heat from the shield to the gas conduit, said shield being constructed of material having thermal conductivity of at least 5 B.tu./hr. ft. ° F. at 100° K. and a thickness of 0.001–0.03 inch.

6. A container according to claim 5 in which said composite multi-layered insulation comprises low conductive fibrous material layers having individual fiber diameters less than about 10 microns and thin flexible sheet radiation barrier layers of less than about 0.008 inch thickness being arranged in alternating sequence.

7. A container according to claim 5, in which said composite multi-layered insulation comprises metal coated-nonmetallic plastic material, the metal coating having a thickness less than about 0.25 micron.

8. A container according to claim 5, in which said inner vessel is suspended from said evaporation gas conduit as support means.

9. A container according to claim 5, in which multiple layers of thin foil comprise the highly conductive shield.

10. A container according to claim 5 in which multiple layers of copper foil comprise the highly conductive shield.

11. A container according to claim 5 in which multiple layers of aluminum foil comprise the highly conductive shield.

12. A container according to claim 5 in which flow resistance means are secured to the inner surface of said evaporation gas conduit.

13. A container according to claim 5 in which the upper end of said inner vessel is said evaporation gas conduit.

14. A container according to claim 5 in which said inner vessel is a liquefied gas conduit, a multiplicity of said evaporation gas conduits are longitudinally spaced along said liquefied gas conduit, and manifold means are provided for joining the outer ends of each of such evaporation gas conduits.

15. A container according to claim 5 in which said inner vessel is a liquefied gas conduit, a multiplicity of the evaporation gas conduits are longitudinally spaced along said liquefied gas conduit, and a manifold means concentrically positioned around said liquefied gas conduit is provided for joining the outer ends of each of such evaporation gas conduits.

16. A container according to claim 5 in which multiple conductive metal shields are provided and the shields adjacent to said inner vessel are thinner than the shields adjacent to said outer shell.

17. A container according to claim 5 in which said inner vessel is supported and stabilized by load rods extending between said outer shell and the inner vessel within said vacuum space, and multiple conductive metal shields are secured to said load rods by low thermal resistance means at regions where the temperature is higher than the temperatures assumed by said shields absent the securing.

UNITED STATES PATENTS
References Cited in the file of this patent

| 1,976,688 | Dana et al. | Oct. 9, 1934 |
| 3,007,596 | Matsch | Nov. 7, 1961 |
| 3,070,968 | Gardner | Jan. 1, 1963 |

FOREIGN PATENTS

| 233,189 | Australia | Mar. 24, 1960 |

OTHER REFERENCES

"Cryogenics," December 1960 (article by Rollin et al. on pages 75–76 relied on).

"Cryogenics," March 1962 (article by Fradkov, on pages 177–179).